United States Patent Office 2,862,033
Patented Nov. 25, 1958

2,862,033

PROCESS FOR PREPARING 1-ACETYL - 6 - OXO-8a-METHYL - 3,4,6,7,8,8a - HEXAHYDRONAPHTHALENE

Melvin S. Newman and Sambasiva Swaminathan, Columbus, Ohio, assignors to The Ohio State University Research Foundation, Columbus, Ohio, a corporation of Ohio No Drawing. Original application January 18, 1952, Serial No. 267,097. Divided and this application August 12, 1953, Serial No. 377,460

1 Claim. (Cl. 260—586)

The present invention relates to the preparation of a novel organic compound and is more particularly concerned with the preparation of 1-acetyl-6-oxo-8a-methyl-3,4,6,7,8,8a-hexahydronaphthalene. The present application is a division of our copending application, Serial Number 267,097, filed January 18, 1952, now abandoned, which is a continuation-in-part of application, Serial Number 242,982, filed August 21, 1951 and which subsequently issued as Patent 2,614,123 on October 14, 1952.

The invention disclosed in this application relates to new compositions of matter.

One object of this invention is to produce a new composition of matter consisting of a 1-acetyl-6-oxo-8a-methyl-3,4,6,7,8,8a-hexahydronaphthalene. This new compound is useful as an intermediate for the total synthesis of steroids and so far as we know has never heretofore been conceived or synthesized. As a starting point for this compound, we can use 8a-methyl-1,2,3,4,6,7,8,8a - octahydro - 1 - ethynyl - 1 - β - hydroxy-6-oxonaphthalene.

The starting compound is disclosed and the process of making it is disclosed in application for United States Patent Serial No. 218,410, now abandoned. In order to produce the new composition of matter, we react the above described starting material with formic acid by dissolving it in formic acid and refluxing. The starting compound (as stated in said copending application Serial No. 218,410) has a formula as follows:

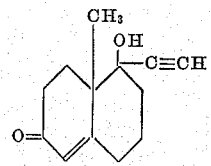

Also as stated in said copending application Serial No. 218,410, the compound has a melting point at 171.5–172.5 and was analyzed to have C, 76.3–76.4 and H, 7.8. Inasmuch as we have found a second epimer or geometric form of the compound, said second form having a lower melting point, the above starting compound is considered as the β epimer and based on the analogy to configurations that have been ascribed to ethynyl alcohols prepared from 17-keto steroids, is considered to have the valence bond of the hydroxyl group above the plane of the paper.

The resulting acetyl compound has a formula as follows:

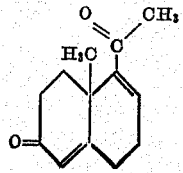

It will be noted that not only are the ethynyl and hydroxyl radicals (i. e.

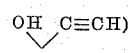

converted into the acetyl radical

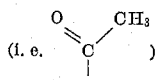

but also the 1 and 2 carbons become unsaturated through the introduction of a double bond between them.

Following is an example of the process we have used to produce our novel composition of matter.

*Example I*

1-acetyl-6-oxo-8a-methyl-3,4,6,7,8,8a-hexahydronaphthalene

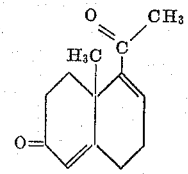

A solution of 8a-methyl-1,2,3,4,6,7,8,8a-octahydro-1-ethynyl-1-β-hydroxy-6-oxonaphthalene (M. P. 171–172°, 2.8 g.) in formic acid (92%; 16 ml.) was refluxed for 2 hours. The reaction mixture was then poured into water and the aqueous suspension extracted with ether twice. The ether extract after successive washings with dilute sodium hydroxide solution, water and saturated sodium chloride solution was dried over anhydrous sodium sulfate and later concentrated. A brown viscous residue remained and was chromatographed on a column of deactivated alumina (Fisher) prepared by treatment with methanol and subsequent drying for 6 hours at 130°.

The reaction product was dissolved in dry benzene (100 ml.) and passed through the column. After most of the benzene had passed through, the column was eluted with ether (200 ml.) and the ether solution concentrated. A viscous liquid remained and solidified on cooling. The solid was crystallized from ether; M. P. 90–93°. A recrystallization from ether yielded the desired acetyl compound having the formula shown above, melting at 92–93°.

$\lambda_{Max}^{EtOH}$ 234 mμ; log₁₀ ε4.29

*Anal.*—Calculated for $C_{13}H_{16}O_2$: C, 76.4; H, 7.9. Found: C, 76.7; H, 8.0.

It is to be understood that modifications of this compound coming within the scope of the invention are intended to be covered by the claims hereof.

We claim:

A process for isomerizing 8a-methyl-1,2,3,4,6,7,8,8a-octahydro-1-ethynyl-1β-hydroxy-6-oxonaphthalene which comprises refluxing a solution of said compound in formic acid for about two hours and separating 1-acetyl-6-oxo-8a-methyl-3,4,6,7,8,8a-hexahydronaphthalene from the reaction mixture.

References Cited in the file of this patent

UNITED STATES PATENTS 2,614,123    Newman et al. _____ Oct. 14, 1952

OTHER REFERENCES

Cassidy: "Adsorption and Chromatography," 1951, pg. 259.